United States Patent
Fujiwara et al.

(10) Patent No.: US 11,981,582 B2
(45) Date of Patent: May 14, 2024

(54) Cu—Cr—Zn—O BASED PIGMENT

(71) Applicant: TOMATEC CO., LTD., Osaka (JP)

(72) Inventors: Jun Fujiwara, Osaka (JP); Tatsuo Matoda, Osaka (JP)

(73) Assignee: TOMATEC CO., LTD., Osaka (JP)

( * ) Notice: Subject to any disclaimer, the term of this patent is extended or adjusted under 35 U.S.C. 154(b) by 0 days.

(21) Appl. No.: 18/351,494

(22) Filed: Jul. 13, 2023

(65) Prior Publication Data

US 2023/0406721 A1  Dec. 21, 2023

Related U.S. Application Data

(63) Continuation of application No. PCT/JP2022/024728, filed on Jun. 21, 2022.

(51) Int. Cl.
  *C09C 1/00* (2006.01)
  *C01G 37/02* (2006.01)
  *C01G 37/033* (2006.01)
  *C09C 1/04* (2006.01)
  *C09C 1/34* (2006.01)

(52) U.S. Cl.
  CPC ............ *C01G 37/02* (2013.01); *C01G 37/033* (2013.01); *C09C 1/043* (2013.01); *C09C 1/346* (2013.01); *C01P 2002/70* (2013.01)

(58) Field of Classification Search
  CPC ......... C09C 1/043; C09C 1/346; C01G 37/02; C01G 37/033; C01P 2002/70
  See application file for complete search history.

(56) References Cited

U.S. PATENT DOCUMENTS

| | | | |
|---|---|---|---|
| 2,309,173 | A | 1/1943 | Diehl |
| 11,174,170 | B2 | 11/2021 | Sakoske et al. |
| 2014/0251185 | A1 | 9/2014 | Harada et al. |
| 2021/0198119 | A1 | 7/2021 | Sakoske et al. |

FOREIGN PATENT DOCUMENTS

| | | |
|---|---|---|
| CN | 110878179 | 3/2020 |
| JP | 08-27393 | 1/1996 |
| JP | 2019-509959 | 4/2019 |
| WO | WO 90/15020 | 12/1990 |
| WO | WO 2013/065813 | 5/2013 |

OTHER PUBLICATIONS

Chavarriaga et al., "Synthesis of Ceramic Nanopigments", TMS2014 143rd Annual Meeting & Exhibition, Supplemental Proceedings, 2014, pp. 837-843.

Miranda et al., "Properties of Ceramic Pigment Zn0.5Cu0.5Cr2O4 Synthesized by Solution Combustion Method", Characterization of Minerals, Metals, and Materials 2016, 2016, pp. 721-727.

Youn et al., "Effect of Metal Doping on CuCr2O4 Pigment for Use in Concentrated Solar Power Solar Selective Coatings", Applied Energy Materials, 2019, 2, pp. 882-888, D01: 10.1021/acsaem.8b01976.

International Search Report for corresponding International Application No. PCT/JP2022/024728, dated Sep. 13, 2022.

Written Opinion for corresponding International Application No. PCT/JP2022/024728, dated Sep. 13, 2022.

*Primary Examiner* — James A Fiorito
(74) *Attorney, Agent, or Firm* — MORI & WARD, LLP

(57) ABSTRACT

A Cu—Cr—Zn—O based pigment includes a Cu—Cr—O based oxide and Zn derived from a zinc oxide added as a modifying oxide and solid-dissolved in the Cu—Cr—O based oxide. The Cu—Cr—Zn—O based pigment has a composition formula of $aCuO \cdot bCr_2O_3 \cdot cZnO$ (mol %), in which $0.1 \leq c \leq 5$, $45 \leq a+c \leq 55$, and $45 \leq b \leq 55$ ($a+b+c=100$).

8 Claims, 3 Drawing Sheets

Cu—Cr—Zn—O BASED PIGMENT

CROSS-REFERENCE TO RELATED APPLICATIONS

The present application is a continuation application of International Application No. PCT/JP2022/024728, filed Jun. 21, 2022. The contents of this application are incorporated herein by reference in their entirety.

BACKGROUND OF THE INVENTION

Technical Field

The present invention relates to a Cu—Cr—Zn—O based pigment.

Background Art

Among pigments used as a colorant, there is a complex inorganic color pigment consisting of a solid solution in which two or more kinds of metal oxides are combined. In general, since the complex inorganic color pigment is extremely stable chemically and physically, the complex inorganic color pigment is excellent in weather resistance, acid resistance, and heat resistance, and is widely used for applications requiring durability, such as coating materials, building materials, and resins.

C.I. pigment black 28 that is a complex inorganic color pigment registered in a color index defined by The Society of Dyers and Colourists (SDC) and The American Association of Textile Chemists and Colorists (AATTC) is a bluish black pigment having a spinel structure consisting of Cu and Cr, and is a pigment excellent in chemical resistance, the heat resistance, and the weather resistance and having extremely high fastness.

As a usage application of the Cu—Cr—O complex inorganic color pigment, in addition to coating materials, plastics, enamel, and a glass color, it is also used for a super durable fluorine coating material and a heat resistant coating material by taking advantage of high fastness thereof. Further, in recent years, it is also used for laser direct structuring (LDS) applications. It is extremely diverse.

Examples of a method for producing a Cu—Cr—O complex inorganic color pigment include a dry method in which copper oxide and chromium oxide as raw materials, and the like are uniformly mixed by using a mixer or a ball mill to produce a mixture (batch), and a wet method in which an aqueous solution of Cu and Cr is reacted with an alkaline aqueous solution to produce a batch as a compound metal hydroxide or oxide consisting of Cu and Cr. In each method, the produced batch is calcined, and a resulting calcined product is milled to finally obtain a pigment.

In a method for producing the batch, the dry method is basically selected based on a plurality of viewpoints that the production method is simple, a production cost is low, and wastewater treatment is unnecessary.

However, the batch consisting of the copper oxide and the chromium oxide produced by the dry method has low reactivity in a solid phase reaction during the calcining, and as a result, a pigment having a sufficient degree of blackness cannot be obtained.

Further, when the calcining is performed at a higher temperature for a purpose of improving the reactivity of the batch in the solid phase reaction, a spinel structure $CuCr_2O_4$ generated is decomposed at a certain temperature or higher to generate $CuCrO_2$. As a result, the degree of blackness and the durability of the pigment are reduced.

To solve such a problem, when a batch is produced by the dry method as the method for producing the Cu—Cr—O complex inorganic color pigment, in addition to the copper oxide and chromium oxide as raw materials, it is common to add a manganese compound such as manganese dioxide or manganese trioxide as a modifying oxide to design a pigment composition as a Cu—Cr—Mn—O based oxide. When the pigment composition is designed as the Cu—Cr—Mn—O based oxide, a pigment having a sufficient degree of blackness and a sufficient tinting strength can be obtained even when the batch is produced by the dry method.

However, when the manganese compound is added as the modifying oxide, the degree of blackness and the tinting strength of the pigment are improved with an increase in an addition amount, but the durability such as the acid resistance and the weather resistance tend to decrease. A valence of chromium ions constituting the spinel structure of the Cu—Cr—O based pigment is trivalent, which is stable, but when the durability of the pigment itself is lowered, there is a concern that hexavalent chromium eluted from the pigment affects the environment and health. For example, in an EU member, usage of specific harmful substances contained in electric and electronic devices is limited, and when an eluting amount of the hexavalent chromium exceeds 1000 ppm, a product cannot be marketed.

The eluting amount of the hexavalent chromium from a complex inorganic color pigment containing chromium is considerably different depending on a content, a type of a coexisting solid solution substance, a calcining condition, a water washing state, and the like. For example, in the C.I. pigment black 28, the eluting amount of the hexavalent chromium may exceed 1000 ppm.

Further, the glass color, which is an example of the usage application of the Cu—Cr—O based pigment, is mainly used for an automobile window glass for a purpose of imparting a design property to a boundary between a vehicle body and the window glass having different color tones, preventing ultraviolet rays for a urethane-based adhesive used for bonding the vehicle body and the glass, and the like, and is required to have the degree of blackness and a light shielding property of the pigment, and acid resistance as an ability for preventing discoloration caused by rain. The glass color is a mixture of an inorganic component such as a glass powder, an inorganic pigment, and a filler, and an organic vehicle, and the design property can be imparted to a glass product by applying the glass color to the glass product by screen printing or the like and then performing baking at a high temperature of 500° C. to 700° C.

However, when the glass color is applied to a float plate glass and baking is performed, copper in a Cu—Cr—O based oxide is reduced by tin on a surface of the plate glass, a boundary between a tin surface of the plate glass and the applied glass color may be reddishly discolored (red discoloration), and the design property of the glass product is impaired. Therefore, there is a demand for a Cu—Cr—O based pigment in which the red discoloration is not exhibited. The red discoloration of the glass color also appears when the durability of the pigment is low, and as a content of Mn in the Cu—Cr—Mn—O based pigment increases, the red discoloration tends to appear more greatly. Further, the Cu—Cr—O based pigment not containing Mn and produced by the dry method does not exhibit the sufficient degree of blackness and the sufficient light shielding property required for the glass color.

Patent literature 1 discloses a technique for reducing an eluting amount of hexavalent chromium by bringing a complex inorganic color pigment containing chromium into contact with hydrous silica and a substance having a reducing ability in a slurry of the pigment, and treating the pigment with the substance. However, a production process of the technique is complicated, and the technique is not suitable for a general-purpose product.

Patent literature 2 discloses a copper-chromium type black pigment obtained by adding, to a mixture of copper oxide and chromium oxide, 15% or less of an oxide of iron, nickel, cobalt, manganese, molybdenum, tungsten, vanadium, or uranium, and then calcining an obtained mixture at a temperature of 800° C. to 1100° C. However, the black pigment that does not contain a large amount of manganese in a component thereof does not exhibit a high degree of blackness and tinting strength.

Patent literature 3 discloses a complex inorganic color pigment having a sufficient degree of blackness and capable of reducing a thermal expansion rate (in this document, described as coefficients of thermal expansion (CTE)) of a glass sufficient for a pigment used for glass enamel (having the same meaning as the glass color in the present application) by containing at least one metal selected from the group consisting of Al, Mg, Ti, Fe, Co, Ni, Zn, Zr, Nb, Y, W, Sb, and Ca in a Cu—Mn—Cr—O (Mn may not necessarily be contained) based oxide. However, durability of the pigment is not disclosed. In addition, as will be described later in detail by an applicant of the present application, sufficient high-temperature stability is not guaranteed in the composition disclosed in Patent Literature 3.

Patent Literature 1: JPH08-27393A
Patent Literature 2: U.S. Pat. No. 2,309,173B
Patent Literature 3: U.S. Pat. No. 11,174,170B Technical Problem In view of the background described above, an object of the present invention is to provide a Cu—Cr—O complex inorganic color pigment having an excellent color characteristic and improved durability.

SUMMARY OF THE INVENTION

The present inventors have found that when a batch is produced by a dry method in a Cu—Cr—O based pigment, by adding a zinc oxide, which is not used in the prior art, in a limited composition range instead of using a manganese compound or an iron compound known as a modifying oxide and performing calcining at an appropriate temperature within a relatively high-temperature range, both a color characteristic and durability of the pigment can be greatly improved as compared with a Cu—Cr—O based pigment in the prior art, and have completed the present invention. That is, in the present application, even when Mn and Fe are not contained, Zn is selected as a metal element to be solid-dissolved in the Cu—Cr—O based oxide, so that both a high degree of blackness and high durability are imparted to the Cu—Cr—O based pigment.

According to one aspect of the present invention, a Cu—Cr—Zn—O based pigment includes a Cu—Cr—O based oxide and Zn derived from a zinc oxide added as a modifying oxide and solid-dissolved in the Cu—Cr—O based oxide. The Cu—Cr—Zn—O based pigment has a composition formula of $a$CuO·$b$Cr$_2$O$_3$·$c$ZnO (mol %), in which $0.1 \leq c \leq 5$, $45 \leq a+c \leq 55$, and $45 \leq b \leq 55$ ($a+b+c=100$).

Preferably, in the Cu—Cr—Zn—O based pigment described above, a by-product CuCrO$_2$ is not included in an X-ray diffraction pattern.

Preferably, in the Cu—Cr—Zn—O based pigment described above, a spinel structure is formed by calcining, at a temperature of 800° C. to 1000° C., a batch obtained by mixing a copper compound, a chromium compound, and a zinc compound as a starting material by a dry method.

Preferably, the Cu—Cr—Zn—O based pigment described above is used as a coloring pigment for a coating material, plastic, and glass.

Preferably, in the Cu—Cr—Zn—O based pigment described above, an eluting amount of hexavalent chromium in a pigment eluate based on an EPA3060A method is 250 ppm or less.

Preferably, the Cu—Cr—Zn—O based pigment described above is used for a glass color, and red discoloration is not exhibited when the Cu—Cr—Zn—O based pigment is baked on a tin surface of a float plate glass at 500° C. to 700° C.

Preferably, the Cu—Cr—Zn—O based pigment described above is used in a laser direct structuring (LDS).

Hereinafter, features of the invention of the present application will be more clarified by comparing a description of U.S. Pat. No. 11,174,170 B2 (hereinafter referred to as a "cited document"), which is thought by the present applicant to be the closest to the invention according to claim 1 of the application among the patent publications disclosed at a time of the present application, with the invention.

The cited document discloses in claim 1 that
a modified copper chromite black spinel comprising a copper chromite based solid solution having a formula A$_a$Cu$_b$Mn$_c$Cr$_d$O$_4$, wherein
A is at least one metal selected from the group consisting of Al, Mg, Ti, Fe, Co, Ni, Zn, Zr, Nb, Y, W, Sb, and Ca, and wherein
$2.6 \leq a+b+c+d \leq 3.2$, wherein
none of a, b, and d is zero.

Here, the definition of "none of a, b, and d is zero" includes a case where c indicating a composition amount of Mn is zero.

Further, "Zn" is included in metals listed as A.

Therefore, it can be recognized that the invention of the cited document includes the invention of the present application in terms of a configuration.

However, in the following two points, it can be said that the invention of the present application has a technical significance different from that of the cited document.

1. The cited document aims to "obtain a black pigment with a reduced CTE" as described above with respect to Patent Literature 3, and to solve the problem, a secondary modifier that is "at least one metal selected from the group consisting of Al, Mg, Ti, Fe, Co, Ni, Zn, Zr, Nb, Y, W, Sb, and Ca" is intended to be adopted.

In contrast, the invention of the present application aims to improve a color characteristic and durability, and to solve this problem, Zn is adopted as a metal contained in addition to metals Cu and Cr as a main component.

The CTE in the cited document does not correlate with the "color characteristic" and the "durability" in the invention of the present application at all, and there is neither a description nor a suggestion of motivating selection of only a combination of c=0 and A=Zn from the invention in the cited document to achieve the excellent "color characteristic" and the excellent "durability" as in the invention of the present application. That is, the invention of the present application has a unique technical significance different from that of the cited document.

2. The Cu—Cr—Zn—O based pigment according to the invention of the present application is formed by solid-dissolving Zn derived from zinc oxide added as a modifying oxide in a Cu—Cr—O based oxide having a spinel structure $CuCr_2O_4$.

Here, in the present specification and claims, "formed by solid-dissolving Zn derived from zinc oxide added as a modifying oxide in a Cu—Cr—O based oxide having a spinel structure $CuCr_2O_4$" means "consisting of the Cu—Cr—O based oxide having the spinel structure $CuCr_2O_4$ and Zn derived from zinc oxide", which means that $CuCrO_2$, which is a sub-phase, is not contained in addition to meaning that other types of metals such as Mn and Fe, which are not derived from the metal oxides described above, are not contained.

As is clear from Examples to be described later, when ZnO is not adopted as the modifying oxide, that is, when the modifying oxide is not used and when $MnO_2$ or $Fe_2O_3$ is used as the modifying oxide, at least one of $Cr_2O_3$ and $CuCrO_2$ is contained even when any calcining condition is selected.

Therefore, "formed by solid-dissolving Zn derived from zinc oxide added as a modifying oxide in a Cu—Cr—O based oxide having a spinel structure $CuCr_2O_4$" is a unique feature of the invention of the present application.

Advantageous Effects of Embodiments

By providing a Cu—Cr—Zn—O based oxide according to the present invention, which is formed by solid-dissolving Zn derived from zinc oxide added as a modifying oxide in a Cu—Cr—O based oxide, the Cu—Cr—Zn—O based oxide has an excellent color characteristic as a pigment, and the durability of a Cu—Cr—O based pigment can also be improved.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1A:
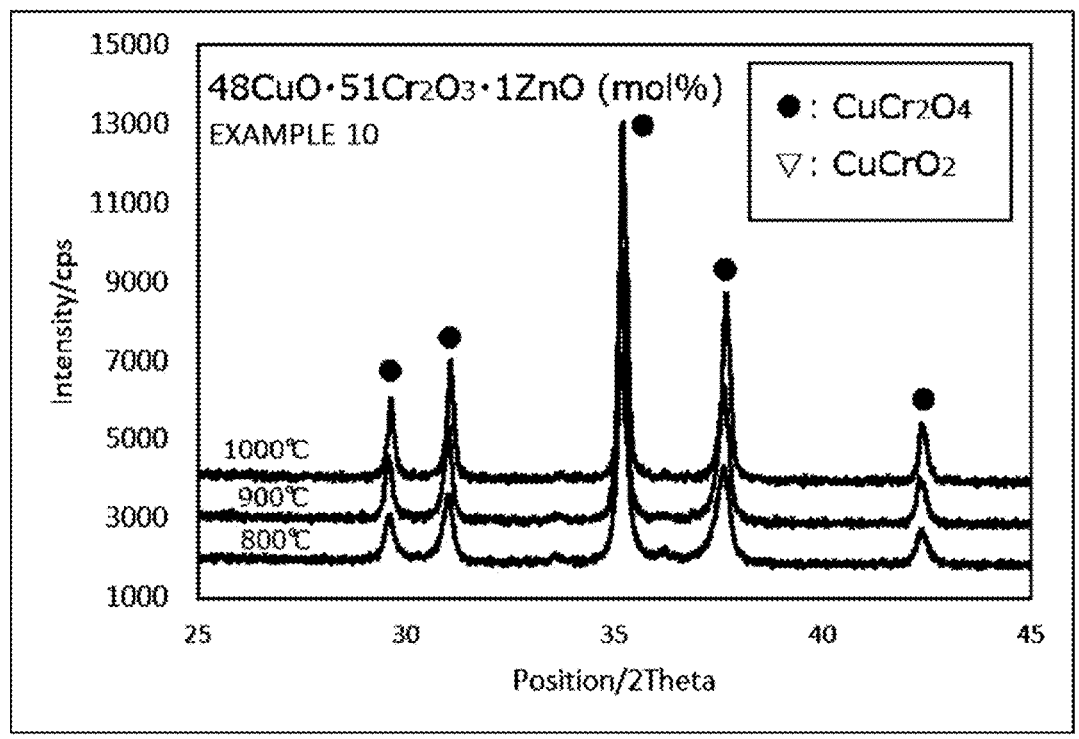
FIG. 1A is a graph showing XRD patterns of a pigment of Example 10.

Hereinafter, an embodiment according to the invention will be described in detail.

A Cu—Cr—Zn—O based pigment according to the present invention is formed by solid-dissolving Zn derived from zinc oxide added as a modifying oxide in a Cu—Cr—O based oxide having a spinel structure.

Further, the oxides have a composition formula of $aCuO \cdot bCr_2O_3 \cdot cZnO$ (mol %), and in the formula, $0.1 \leq c \leq 5$, $45 \leq a+c \leq 55$, and $45 \leq b \leq 55$ ($a+b+c=100$).

The spinel structure is a kind of a typical crystal structure form generally found in a multiple oxide or a multiple sulfide of a metal element, which is represented by a general formula $AB_2X_4$. The Cu—Cr—O based oxide having the spinel structure has a general formula $CuCr_2O_4$.

ZnO in an oxide composition of the Cu—Cr—Zn—O based pigment according to the present invention is added as the modifying oxide as described above.

Zinc oxide ZnO is not used as the modifying oxide in the prior art, but when an appropriate amount of zinc oxide ZnO is added during blending of raw materials in a pigment producing process, and a batch obtained through a mixing process based on a dry method is calcined within a predetermined temperature range, reactivity during sintering is improved, and thus both a color characteristic and durability are greatly improved as compared with a Cu—Cr—O based pigment in the prior art (that is, a pigment to which the modifying oxide is not added, or a pigment to which another modifying oxide such as manganese oxide $MnO_2$ or iron oxide $Fe_2O_3$ is added).

The Cu—Cr—Zn—O based pigment according to the present invention belongs to C.I. pigment black 28 as a pigment component, but is different from the pigment in the prior art in that Mn and Fe are not contained as a metal of the modifying oxide. Based on this difference, the Cu—Cr—Zn—O based pigment according to the present invention is characterized in that the Cu—Cr—Zn—O based pigment has an advantage that, as a color characteristic, a degree of blackness is substantially equal to that of a Cu—Cr—Mn—O based pigment in the prior art, and a degree of redness and a degree of blueness are high.

The oxide composition of the Cu—Cr—Zn—O based pigment according to the present invention preferably consists of 40 to 54.9 mol % of copper oxide (CuO), 45 to 55 mol % of chromium oxide ($Cr_2O_3$), and 0.1 to 5.0 mol % of zinc oxide (ZnO) which is an additive component. It is found that when oxide composition amounts of the pigment is out of these ranges, a sufficient color characteristic and sufficient durability are not obtained.

Specifically, by using ZnO as the modifying oxide, the color characteristic of the Cu—Cr—O based pigment can be greatly improved. Specifically, as compared with the Cu—Cr—O based pigment, in the Cu—Cr—Zn—O based pigment in which a composition of three components of CuO, $Cr_2O_3$, and ZnO and a calcining temperature are optimized, in a color tone obtained when producing an acrylic coating material having a pigment concentration of 10 wt % concentration, and drawing down the coating material at a thickness of 150 μm, L* decreases by about 2.0 or more, a* increases by about 0.5 or more, and b* decreases by 0.5 or more.

Although it is known that $MnO_2$ or $Fe_2O_3$ is used as the modifying oxide in a method for improving the color characteristic in the prior art, the Cu—Cr—Zn—O based pigment using ZnO as the modifying oxide according to the present invention has a more excellent color characteristic in that a* is higher and b* is lower, as compared with the Cu—Cr—Mn—O based pigment using $MnO_2$ as the modifying oxide, or in that L* is lower and b* is lower, as compared with the Cu—Cr—Fe—O based pigment using $Fe_2O_3$ as the modifying oxide.

In addition, the durability of the pigment according to the present invention is greatly improved. That is, the Cu—Cr—Zn—O based pigment has acid resistance and alkali resistance, and therefore can prevent hexavalent chromium from being eluted to an outside.

Further, in the pigment according to the present invention, a glass color in which red discoloration is prevented can be provided when the pigment is used for a glass color application.

This effect is obtained by performing the calcining in a temperature range of 800° C. to 1000° C., which is a relatively high range, and at the time of filing of the present invention, it is not clear that the effect is caused by any structure or characteristic of the pigment, and thus it is inevitable to define a scope of the invention of the present application by the temperature range described above.

Next, a method for producing the Cu—Cr—Zn—O based pigment according to the present invention will be described.

Since the pigment according to the present invention contains the Cu—Cr—O based oxide as a main component and further contains Zn derived from zinc oxide added thereto as the modifying oxide, a copper compound, a chromium compound, and a zinc compound are prepared as raw materials thereof.

Each of raw materials may be any material as long as each of them contain the metal elements described above and form each of oxides in a production process. Specific examples of these compounds include hydroxides, oxides, carbonates, and the like, and may be used alone or in a combination of a plurality of compounds.

Any method may be used as long as the method is known as a general method for producing a complex inorganic color pigment containing a metal oxide as a main component. Such a production method mainly includes a step 1) of mixing the raw materials, a step 2) of calcining a generated mixture, and a step 3) of milling a calcined product.

The step 1) of mixing the raw materials is limited to the dry method. This is because, when other methods are used, there are problems that the production methods or steps become complicated, a production cost increases, and wastewater treatment equipment is required.

In the step 2) of calcining the obtained mixture, the obtained mixture (batch) is calcined at 800° C. to 1000° C. for about 3 to 6 hours to solid-dissolve and crystallize the components.

It is known that when the calcining temperature is too high, the color characteristic is deteriorated due to formation of a sub-phase, and when the calcining temperature is too low, problems such as insufficient color development, or uneven calcining are caused.

In the present invention, by performing the calcining in the temperature range of 800° C. to 1000° C. described above, an effect that $L^*$ decreases, $a^*$ increases, and $b^*$ decreases can be obtained. In contrast, when $MnO_2$ or $Fe_2O_3$ is used as the modifying oxide in the prior art, a sub-phase $CuCrO_2$ is generated when the calcining is performed at a temperature of 900° C. or higher, and as a result, there is a problem that $L^*$ increases.

Finally, the calcined product obtained in the step 2) is subjected to the milling step 3). In the milling step 3), a particle size is generally adjusted by milling, a milling method is not particularly limited as long as a pigment having a desired particle size can be obtained, and a general dry-type milling method or a general wet-type milling method can be applied.

Examples of a mill include an attritor and a jet mill in a case of the dry-type milling, and a ball mill, a vibration mill, and a medium agitation type mill in a case of the wet-type milling. In the case of the wet-type milling, a slurry after the milling is sufficiently dried and crushed to obtain a target product.

According to the production method described above, when the batch is produced by the dry method for the Cu—Cr—O based pigment having the spinel structure consisting of Cu and Cr, the color characteristic of the Cu—Cr—O based pigment can be greatly improved by adding a predetermined amount of zinc oxide as the modifying oxide.

Though it is known that $MnO_2$ or $Fe_2O_3$ is used as the modifying oxide in a method for improving the color characteristic, when ZnO is used as the modifying oxide, the excellent color characteristics are obtained as compared with the case where these modifying oxides are used, and in addition, the durability of the pigment can be greatly improved.

Further, the pigment according to the present invention can be used as a general-purpose product having a simple production process.

EXAMPLES

Then, to specifically describe the present invention, several Examples according to the present invention and Comparative Examples for comparison with Examples will be described.

A pigment composition is represented by $aCuO \cdot bCr_2O_3 \cdot cX$ (mol %) (X=ZnO, $Mn_2O_3$, $Fe_2O_3$) for convenience.

Examples 1 to 21

In the following Examples 1 to 21, based on a composition formula of $aCuO \cdot bCr_2O_3 \cdot cZnO$ (mol %), predetermined amounts of copper oxide, chromium oxide, and zinc oxide were weighed such that a total weight thereof was 100 g to obtain a target pigment composition by variously changing (a, b, and c) in a range satisfying $0.1 \leq c \leq 10$, $40 \leq a+b \leq 60$, and $40 \leq b \leq 60$ (a+b+c=100). Specific values of (a, b, and c) were shown in the following Tables 1a, 1b, and 1c.

Next, these oxides were sufficiently mixed by using a ball mill until a uniform mixture (batch) was obtained.

Next, 30 g of the batch was weighed and put in a mullite crucible and calcined in an electric furnace. A calcining condition was set to three temperatures of 800° C., 900° C., and 1000° C. per composition for 9 hours.

After the batch was calcined, 25 g of the obtained calcined product, 100 g of glass beads having a diameter (φ) of 3 mm, and 50 g of distilled water were separately weighed and put in a glass container having a capacity of 140 mL, a lid was closed, and the calcined product was milled for 30 minutes by using a paint conditioner.

After the calcined product was milled, a milled slurry was poured into an aluminum foil container and dried at 120° C. for about 5 hours.

After the milled slurry was dried, a dried product was crushed by using a pestle and a mortar to produce a pigment having the desired composition.

Comparative Examples 1 to 3

Unlike Examples 1 to 21, based on $aCuO \cdot bCr_2O_3$ (mol %), (a and b) were selected in a range of $45 \leq a \leq 55$ and $45 \leq b \leq 55$ (a+b=100) to produce a Cu—Cr—O based pigment consisting of Cu and Cr and not containing modifying oxide.

A production method was the same as those in Examples 1 to 21 described above.

Comparative Examples 4 to 6

Based on $aCuO \cdot bCr_2O_3 \cdot cMn_2O_3$ (mol %), (a, b, and c) were set in a range of $45 \leq a \leq 55$, $40 \leq b \leq 50$, and c=5 (a+b+ c=100), a Cu—Cr—Mn—O based pigment consisting of Cu, Cr, and Mn which contains a metal element Mn derived from manganese dioxide $MnO_2$ added as the modifying oxide in the prior art was produced.

A production method of the pigment was the same as those in Examples 1 to 21 described above.

Comparative Examples 7 to 9

Based on $aCuO \cdot bCr_2O_3 \cdot cFe_2O_3$ (mol %), (a, b, and c) were selected in a range of 45≤a≤55, 40≤b≤50, and c=5 (a+b+c=100) to produce a Cu—Cr—Fe—O based pigment consisting of Cu, Cr, and Fe which contains a metal element Fe derived from iron oxide $Fe_2O_3$ added as the modifying oxide in the prior art in the same manner as in Examples 1 to 21 described above.

(Characteristic Evaluation)

((a) Color Tone)

Into 100 parts by weight of an acrylic resin, 10 parts by weight of each of the multiple oxide pigments obtained in Examples 1 to 21 and Comparative Examples 1 to 9 were dispersed by the paint conditioner.

Next, an obtained coating material was drawn down onto a white paper by using a 150 μm applicator. After drying, a color of a coating film was measured with a spectrophotometer (standard light source C, 2° field of view).

For a purpose of evaluating a result thereof, a result of colorimetry by a CIELAB color system is shown in Tables 1a, 1b, and 1c below.

((b) XRD Diffraction Pattern Analysis)

Among each of the Cu—Cr—Zn—O, Cu—Cr—O, Cu—Cr—Mn—O, and Cu—Cr—Fe—O based pigments produced in Examples 1 to 21 and Comparative Examples 1 to 9, compositions having a most excellent color characteristic were selected, and XRD diffraction patterns of the pigments produced at the calcining temperatures of 800° C., 900° C., and 1000° C. were compared for each component system, thereby observing changes in crystal structures of the pigments with an increase in the calcining temperature when the pigments were produced.

((c) Acid and Alkali Resistance Test)

Based on evaluation results of (a) and (b), among each of the produced Cu—Cr—Zn—O, Cu—Cr—O, Cu—Cr—Mn—O, and Cu—Cr—Fe—O based pigments, compositions having the most excellent color characteristic and having no heterogeneous phase $CuCrO_2$ detected in the crystal structure were selected. Specifically, the Cu—Cr—Zn—O based pigment calcined at 1000° C. in Example 10, the Cu—Cr—O based pigment calcined at 800° C. in Comparative Example 2, the Cu—Cr—Mn—O based pigment calcined at 800° C. in Comparative Example 5, and the Cu—Cr—Fe—O based pigment calcined at 800° C. in Comparative Example 8 were selected.

Each of the selected pigments was weighed and put in a 5 wt % HCl aqueous solution or a 20 wt % NaOH aqueous solution to have a pigment concentration of 10 wt %, and immersed for 3 days.

After 3 days immersing of the pigments, the eluates were extracted by suction filtration.

A main component amount of the pigment immersed in each of the eluates was measured by high frequency inductively coupled plasma (ICP) chemical analysis, and the durability of the pigment of each component system was compared.

((d) Evaluation of Eluting Amount of Hexavalent Chromium)

Eluates of hexavalent chromium were produced from the Cu—Cr—Zn—O based pigment at 1000° C. in Example 10, the Cu—Cr—O based pigment calcined at 800° C. in Comparative Example 2, the Cu—Cr—Mn—O based pigment calcined at 800° C. in Comparative Example 5, and the Cu—Cr—Fe—O based pigment calcined at 800° C. in Comparative Example 8 by a method based on an EPA3060A (ALKALINE DIGESTION FOR HEXAVALENT CHROMIUM). Concentrations of hexavalent chromium in the eluates were measured by diphenylcarbazide absorptiometry. (JISK0102).

((e) Evaluation of Red Discoloration in Glass Color)

For the Cu—Cr—Zn—O based pigment calcined at 1000° C. in Example 10, the Cu—Cr—O based pigment calcined at 800° C. in Comparative Example 2, the Cu—Cr—Mn—O based pigment calcined at 800° C. in Comparative Example 5, and the Cu—Cr—Fe—O based pigment calcined at 800° C. in Comparative Example 8, 1.2 g of each of these pigments and 0.6 g of a vehicle were weighed and sufficiently mixed by using a hoover muller to produce a paste. The produced paste was drawn down on a tin surface of a plate glass by using an applicator having a thickness of 76.2 μm, and dried in a drying furnace at 120° C. for 30 minutes. Further, the plate glass was baked in the electric furnace at 680° C. for 20 minutes and was sufficiently naturally cooled, followed by washing away the pigment on the plate glass with tap water, and the red discoloration on the tin surface of the plate glass was observed.

Next, results of the tests described above will be described.

With respect to Examples 1 to 20 and Comparative Examples 1 to 9, the color tone at each calcining temperature set during the production of the Cu—Cr—Zn—O, Cu—Cr—O, Cu—Cr—Mn—O, and Cu—Cr—Fe—O based pigments are shown in the following Tables 1a, 1b, and 1c.

TABLE 1a

| | Composition (mol %) | | | Calcining Temperature | Color | | |
|---|---|---|---|---|---|---|---|
| | CuO | $Cr_2O_3$ | ZnO | ° C. | L* | a* | b* |
| Example 1 | 39.9 | 60.0 | 0.1 | 800 | 12.4 | −1.4 | −1.0 |
| | | | | 900 | 12.7 | −1.5 | −0.7 |
| | | | | 1000 | 13.0 | −2.1 | 0.3 |
| Example 2 | 39.0 | 60.0 | 1.0 | 800 | 13.1 | −1.6 | −1.1 |
| | | | | 900 | 13.0 | −1.6 | −1.0 |
| | | | | 1000 | 12.6 | −2.1 | 0.1 |
| Example 3 | 35.0 | 60.0 | 5.0 | 800 | 14.5 | −2.2 | −0.5 |
| | | | | 900 | 13.7 | −2.1 | −0.7 |
| | | | | 1000 | 13.2 | −2.4 | −0.2 |
| Example 4 | 30.0 | 60.0 | 10.0 | 800 | 15.6 | −2.7 | 0.5 |
| | | | | 900 | 14.8 | −2.5 | −0.4 |
| | | | | 1000 | 14.3 | −2.8 | −0.2 |
| Example 5 | 44.9 | 55.0 | 0.1 | 800 | 10.7 | 0.0 | −2.1 |
| | | | | 900 | 10.5 | 0.2 | −2.3 |
| | | | | 1000 | 10.9 | −0.1 | −1.9 |
| Example 6 | 44.0 | 55.0 | 1.0 | 800 | 11.4 | −0.4 | −2.0 |
| | | | | 900 | 11.3 | −0.3 | −2.1 |
| | | | | 1000 | 10.6 | −0.7 | −1.4 |
| Example 7 | 40.0 | 55.0 | 5.0 | 800 | 12.2 | −0.9 | −1.7 |
| | | | | 900 | 12.0 | −0.7 | −2.1 |
| | | | | 1000 | 11.5 | −1.0 | −1.6 |
| Example 8 | 35.0 | 55.0 | 10.0 | 800 | 13.5 | −1.5 | −1.0 |
| | | | | 900 | 12.7 | −1.2 | −1.7 |
| | | | | 1000 | 12.3 | −1.2 | −1.8 |
| Example 9 | 44.9 | 50.0 | 0.1 | 800 | 10.4 | 0.3 | −1.9 |
| | | | | 900 | 10.8 | 0.2 | −2.1 |
| | | | | 1000 | 11.6 | 0.2 | −2.4 |

TABLE 1a-continued

| | Composition (mol %) | | | Calcining Temperature | Color | | |
|---|---|---|---|---|---|---|---|
| | CuO | Cr$_2$O$_3$ | ZnO | ° C. | L* | a* | b* |
| Example 10 | 48.0 | 51.0 | 1.0 | 800 | 10.2 | 0.3 | -2.5 |
| | | | | 900 | 9.8 | 0.6 | -2.8 |
| | | | | 1000 | 9.4 | 0.8 | -2.8 |

TABLE 1b

| | CuO | Cr$_2$O$_3$ | ZnO | ° C. | L* | a* | b* |
|---|---|---|---|---|---|---|---|
| Example 11 | 49.0 | 50.0 | 1.0 | 800 | 9.5 | 0.5 | -2.7 |
| | | | | 900 | 9.3 | 0.7 | -2.8 |
| | | | | 1000 | 9.6 | 0.7 | -2.7 |
| Example 12 | 45.0 | 50.0 | 5.0 | 800 | 10.6 | 0.1 | -2.5 |
| | | | | 900 | 9.6 | 0.4 | -2.8 |
| | | | | 1000 | 9.4 | 0.5 | -2.6 |
| Example 13 | 40.0 | 50.0 | 10.0 | 800 | 11.4 | -0.4 | -1.9 |
| | | | | 900 | 10.8 | -0.2 | -2.5 |
| | | | | 1000 | 9.4 | 0.2 | -2.5 |
| Example 14 | 54.9 | 45.0 | 0.1 | 800 | 10.5 | 0.3 | -1.8 |
| | | | | 900 | 16.5 | -1.1 | -1.6 |
| | | | | 1000 | 17.9 | -1.4 | -1.7 |
| Example 15 | 54.0 | 45.0 | 1.0 | 800 | 9.7 | 0.5 | -2.1 |
| | | | | 900 | 14.6 | -0.9 | -1.9 |
| | | | | 1000 | 16.8 | -1.1 | -2.1 |
| Example 16 | 50.0 | 45.0 | 5.0 | 800 | 10.2 | 0.1 | -2.2 |
| | | | | 900 | 15.1 | -1.1 | -1.9 |
| | | | | 1000 | 16.1 | -1.3 | -1.9 |
| Example 17 | 45.0 | 45.0 | 10.0 | 800 | 11.0 | -0.3 | -1.7 |
| | | | | 900 | 15.7 | -1.4 | -1.6 |
| | | | | 1000 | 16.1 | -1.6 | -1.6 |
| Example 18 | 59.9 | 40.0 | 0.1 | 800 | 10.9 | 0.3 | -1.5 |
| | | | | 900 | 22.4 | -2.8 | -0.1 |
| | | | | 1000 | 24.3 | -3.2 | 0.1 |
| Example 19 | 59.0 | 40.0 | 1.0 | 800 | 10.1 | 0.5 | -2.1 |
| | | | | 900 | 21.2 | -2.5 | -0.6 |
| | | | | 1000 | 22.5 | -2.8 | -0.4 |
| Example 20 | 55.0 | 40.0 | 5.0 | 800 | 10.4 | 0.1 | -1.9 |
| | | | | 900 | 21.1 | -2.6 | -0.4 |
| | | | | 1000 | 22.9 | -3.1 | 0.1 |
| Example 21 | 50.0 | 40.0 | 10.0 | 800 | 11.5 | -0.3 | -1.5 |
| | | | | 900 | 23.0 | -2.8 | 0.4 |
| | | | | 1000 | 24.3 | -3.3 | 0.7 |

TABLE 1c

| | Composition (mol %) | | | Calcining Temperature | Color | | |
|---|---|---|---|---|---|---|---|
| | CuO | Cr$_2$O$_3$ | | ° C. | L* | a* | b* |
| Comparative Example 1 | 45.0 | 55.0 | — | 800 | 11.8 | -0.1 | -1.4 |
| | | | | 900 | 12.0 | -0.1 | -1.5 |
| | | | | 1000 | 12.0 | 0.2 | -1.8 |
| Comparative Example 2 | 50.0 | 50.0 | — | 800 | 11.7 | 0.0 | -1.5 |
| | | | | 900 | 13.6 | -0.5 | -1.1 |
| | | | | 1000 | 13.8 | -0.3 | -1.8 |
| Comparative Example 3 | 55.0 | 45.0 | — | 800 | 11.7 | 0.1 | -1.5 |
| | | | | 900 | 15.3 | -0.9 | -1.1 |
| | | | | 1000 | 16.2 | -0.9 | -1.5 |

| | CuO | Cr$_2$O$_3$ | Mn$_2$O$_3$ | ° C. | L* | a* | b* |
|---|---|---|---|---|---|---|---|
| Comparative Example 4 | 45.0 | 50.0 | 5.0 | 800 | 9.5 | 0.3 | -1.9 |
| | | | | 900 | 10.4 | 0.3 | -1.9 |
| | | | | 1000 | 13.0 | -0.1 | -1.6 |
| Comparative Example 5 | 50.0 | 45.0 | 5.0 | 800 | 9.7 | 0.3 | -1.6 |
| | | | | 900 | 11.5 | 0.3 | -1.6 |
| | | | | 1000 | 13.6 | 0.1 | -1.4 |
| Comparative Example 6 | 55.0 | 40.0 | 5.0 | 800 | 11.7 | 0.1 | -1.5 |
| | | | | 900 | 12.4 | 0.4 | -1.4 |
| | | | | 1000 | 14.5 | 0.2 | -1.1 |

TABLE 1c-continued

| | CuO | Cr$_2$O$_3$ | Fe$_2$O$_3$ | ° C. | L* | a* | b* |
|---|---|---|---|---|---|---|---|
| Comparative Example 7 | 45.0 | 50.0 | 5.0 | 800 | 11.0 | 0.3 | -0.7 |
| | | | | 900 | 11.0 | 0.4 | -0.8 |
| | | | | 1000 | 12.2 | 0.6 | -0.9 |
| Comparative Example 8 | 50.0 | 45.0 | 5.0 | 800 | 10.8 | 0.3 | -0.5 |
| | | | | 900 | 12.0 | 0.8 | -0.9 |
| | | | | 1000 | 13.0 | 0.9 | -1.0 |
| Comparative Example 9 | 55.0 | 40.0 | 5.0 | 800 | 11.2 | 0.3 | -0.5 |
| | | | | 900 | 12.9 | 1.3 | -1.0 |
| | | | | 1000 | 13.9 | 1.4 | -1.1 |

In the tables described above, L* represents a brightness, +a* represents a color tone in a red direction, -a* represents a color tone in a green direction, +b* represents a color tone in a yellow direction, and -b* represents a color tone in a blue direction. Regarding a black pigment, a color tone having a high degree of blackness, a strong red color, and a strong blue color is preferred, and it was comprehensively observed and determined that L* is low, a* is high, and b* is low in comparison of a significant difference in a color tone characteristic.

Figure 1B:
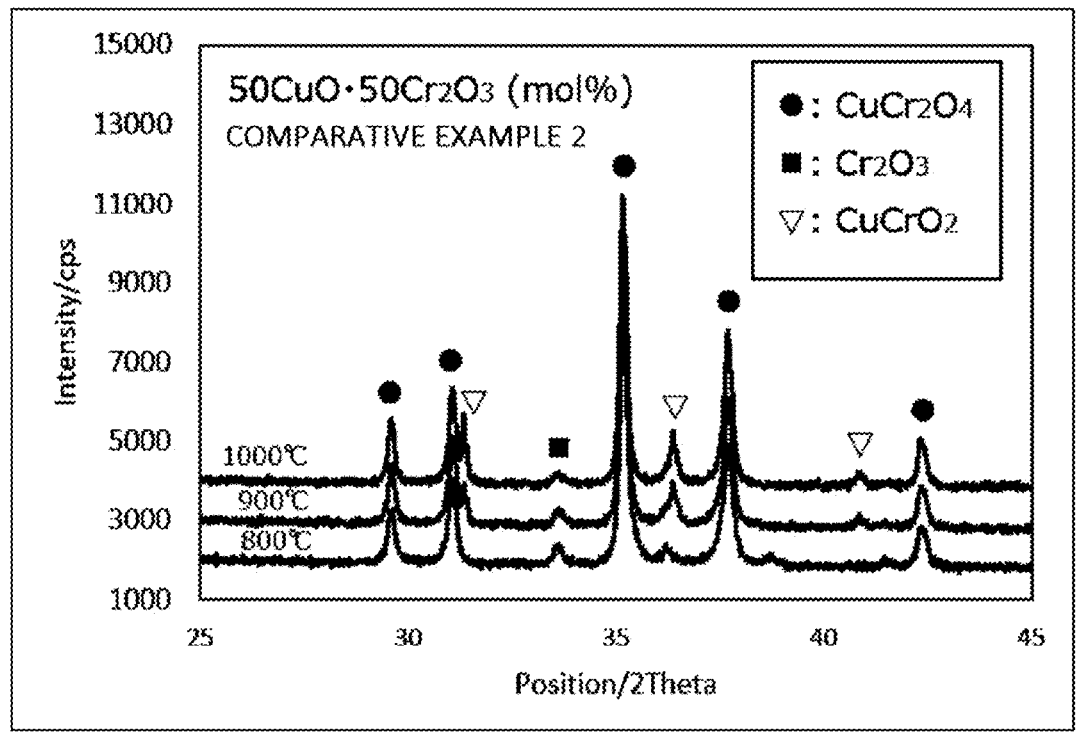
FIG. 1B is a graph showing XRD patterns of a pigment of Comparative Example 2.

FIG. 1A shows XRD patterns of Example 10, and FIG. 1B shows XRD patterns of Comparative Example 2, at the calcining temperatures of 800° C., 900° C., and 1000° C.

According to Tables 1a, 1b, and 1c described above, in the Cu—Cr—O based pigments to which the modifying oxide was not added, it was observed from Comparative Examples 1 to 3 that L* of the pigments produced at the calcining temperature of 800° C. was 11.7 to 11.8, L* of the pigments produced at the calcining temperature of 900° C. was 12.0 to 15.3, and L* of the pigments produced at the calcining temperature of 1000° C. was 12.0 to 16.2, and in all of the Comparative Examples, the degree of blackness tended to decrease as the calcining temperature increased.

According to the XRD pattern at the calcining temperature of 800° C. for the Cu—Cr—O based pigment shown in Comparative Example 2 of FIG. 1B, in addition to a diffraction peak attributed to a main phase CuCr$_2$O$_4$, a diffraction peak attributed to a raw material Cr$_2$O$_3$ used was also detected. In each of the pigments produced at the calcining temperature of 900° C. or higher, in addition to those attributed to the main phase CuCr$_2$O$_4$ and a raw material Cr$_2$O$_3$, a diffraction peak attributed to the sub-phase CuCrO$_2$ was detected.

When the Cu—Cr—O based pigment consisting of Cu and Cr is produced, it can be said that reactions between copper oxide and chromium oxide used as starting materials during calcining are insufficient in the case of the batch obtained by the dry method even when a composition design is performed so that those used as starting materials theoretically react with each other without excess or deficiency. Further, it is suggested that when the Cu—Cr—O based pigment is produced, it is necessary to set an optimum calcining temperature, because, when calcining is performed at a temperature higher than the optimum calcining temperature, in addition to the main phase CuCr$_2$O$_4$, the sub-phase CuCrO$_2$ are formed in the pigment, and as a result, the degree of blackness of the pigment decreases.

Therefore, it can be said that the optimum calcining temperature when the Cu—Cr—O based pigment is produced from the batch obtained by the dry method is preferably around 800° C., and it is found that conversely, the pigment should not be calcined at a high temperature of 900° C. or higher.

Regarding the Cu—Cr—Mn—O based pigments to which $MnO_2$ was added as the modifying oxide, according to Comparative Examples 4 to 6, L* of the pigments produced at the calcining temperature of 800° C. was 9.5 to 11.7, and the degree of blackness was higher, and the color characteristic was more excellent than those of the Cu—Cr—O based pigments shown in Comparative Examples 1 to 3. On the other hand, the pigments produced at the calcining temperature of 900° C. or higher had a lower L* than the pigments produced at the calcining temperature of 800° C., and it was observed that in the Cu—Cr—Mn—O based pigments, the degree of blackness decreased as the calcining temperature increased similarly to the Cu—Cr—O based pigment.

Figure 1C:
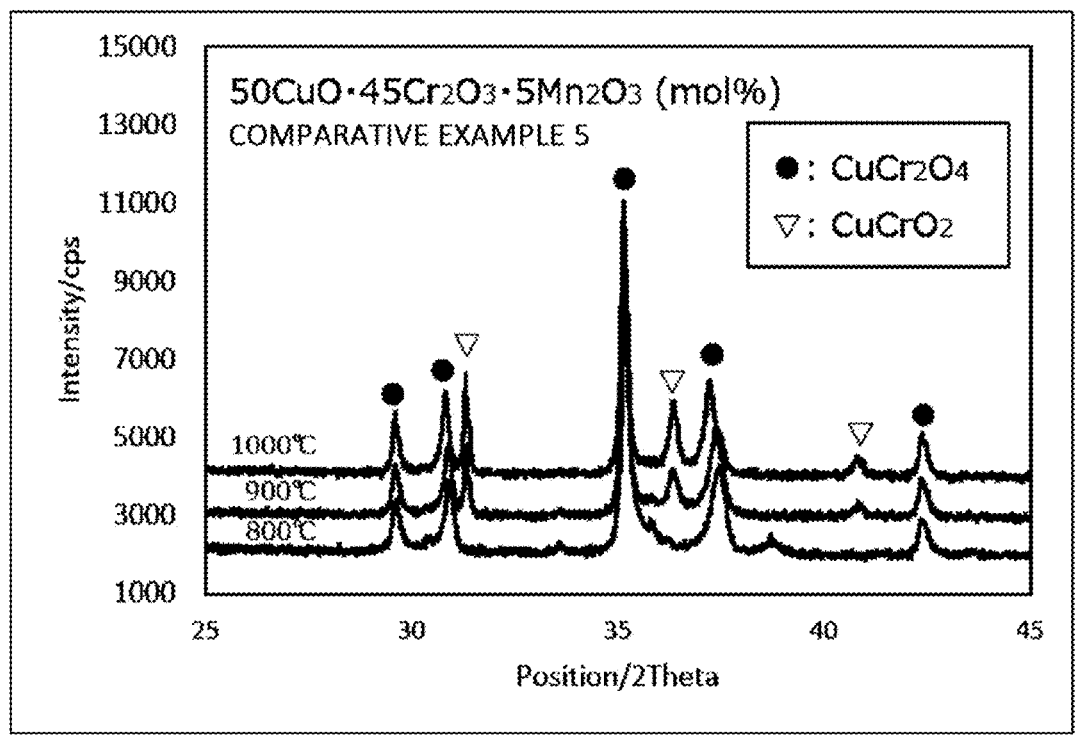
FIG. 1C is a graph showing XRD patterns of a pigment of Comparative Example 5.

According to the XRD patterns of the Cu—Cr—Mn—O based pigment shown in Comparative Example 5 in FIG. 1C, in addition to diffraction peak attributed to the main phase $CuCr_2O_4$, the diffraction peak attributed to the sub-phase $CuCrO_2$ was detected in each of the pigments produced at the calcining temperature of 900° C. or higher in the same manner as in Comparative Example 2. Therefore, it was found that when $MnO_2$ was added as the modifying oxide to produce the Cu—Cr—Mn—O based pigment, the color characteristic of the pigment was greatly improved, the calcining temperature during the production of the pigment was preferably around 800° C. as in the case of the Cu—Cr—O based pigment, and the pigment should not be calcined at the high temperature of 900° C. or higher.

Regarding the Cu—Cr—Fe—O based pigments to which $Fe_2O_3$ was added as the modifying oxide, according to Comparative Examples 7 to 9, it was found from the results shown in Table 1c that L* of the pigments produced at the calcining temperature of 800° C. was 10.8 to 11.2, the degree of blackness was higher, and the color characteristic was improved, as compared with the Cu—Cr—O based pigments shown in Comparative Examples 1 to 3, but the color characteristic was not improved as much as the Cu—Cr—Mn—O based pigments to which $MnO_2$ was added as the modifying oxide shown in Comparative Examples 4 to 6.

Figure 1D:
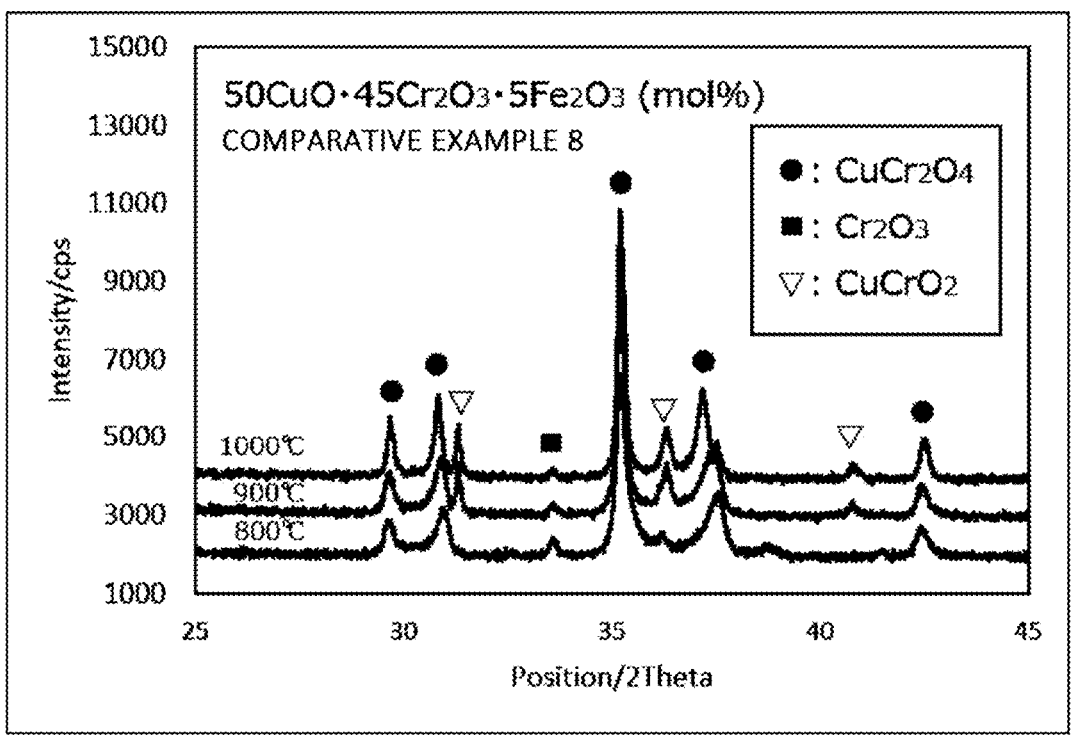
FIG. 1D is a graph showing XRD patterns of a pigment of Comparative Example 8.

In addition, according to the XRD patterns of the Cu—Cr—Fe—O based pigment shown in Comparative Example 8 in FIG. 1D, there was a tendency similar to the XRD patterns of the Cu—Cr—O based pigment shown in Comparative Example 2 and the Cu—Cr—Mn—O based pigment shown in Comparative Example 5. Therefore, it was found that when the Cu—Cr—Fe—O based pigment was produced by adding $Fe_2O_3$ as the modifying oxide, the color characteristic of the pigment was slightly improved, the calcining temperature during the production of the pigment was preferably around 800° C. as in the case of the Cu—Cr—O based pigment and the Cu—Cr—Mn—O based pigment, and the pigment should not be calcined at the high temperature of 900° C. or higher.

In Examples 5 to 7, Examples 9 to 12, and Examples 14 to 16, (a, b, and c) were selected in a range satisfying $0.1 \leq c \leq 5$, $45 \leq a+c \leq 55$, and $45 \leq b \leq 55$ (a+b+c=100) for $aCuO \cdot bCr_2O_3 \cdot cZnO$ (mol %) of the pigments of Examples 1 to 21 to which ZnO is added as the modifying oxide. When Cu—Cr—Zn—O based pigments produced under a calcining temperature condition allowing a highest degree of blackness were selected from the compositions described above, L* was 9.3 to 11.5, and an improvement in the degree of blackness as the pigment characteristic was achieved as compared with the Cu—Cr—O based pigments shown in Comparative Examples 1 to 3. Further, in these pigments, a composition having the excellent color characteristic was confirmed based on an aspect that a* was high, and b* was low, that is, the red color was strong, and the blue color was strong as compared with the Cu—Cr—Mn—O based pigments shown in Comparative Examples 4 to 6 to which $MnO_2$ was added as the modifying oxide.

Further, regarding the Cu—Cr—Zn—O based pigments, a composition in which the color characteristic of the pigment was increased as the calcining temperature was set to be high in the range of 800° C. to 1000° C. during the production of the pigment was also confirmed.

As shown in FIG. 1A, from the XRD patterns of the Cu—Cr—Zn—O based pigment shown in Example 10, only the diffraction peak attributed to the main phase $CuCr_2O_4$ was detected in each of the pigments produced at the calcining temperatures of 800° C., 900° C., and 1000° C. When the XRD patterns of the pigments produced at the calcining temperature of 800° C. of the Cu—Cr—O based pigments shown in Example 10 and Comparative Example 2 are compared with each other, in Example 10, an intensity of the diffraction peak attributed to the raw material $Cr_2O_3$ used is small, and further, in Example 10, the diffraction peak attributed to $Cr_2O_3$ is hardly detected in the pigment produced at the calcining temperature of 1000° C., and therefore, it is considered that the reactivity between different types of raw materials during calcining is sufficiently improved by adding ZnO as the modifying oxide.

Further, based on the XRD patterns of Comparative Example 2, Comparative Example 5, and Comparative Example 8, in the case of Cu—Cr—O, Cu—Cr—Mn—O, and Cu—Cr—Fe—O bases, the diffraction peak attributed to the sub-phase $CuCrO_2$ was detected in all the pigments produced at the calcining temperature of 900° C. or higher, whereas in the case of Cu—Cr—Zn—O based oxide shown in Example 10, the diffraction peak attributed to the sub-phase $CuCrO_2$ was not detected in the pigment produced at the calcining temperature of 1000° C. Therefore, it can be said that when ZnO is added as the modifying oxide, a higher calcining temperature can be set during the production of the pigment as compared with the case where $MnO_2$ or $Fe_2O_3$ known as the modifying oxide is added.

Next, results of (c) acid and alkali resistance test will be described.

Results of the acid resistance test are shown in Table 2 below, and results of the alkali resistance test are shown in Table 3 below.

TABLE 2

| Ion Concentration in 5 wt % HCl Solution | Cu ppm | Cr ppm | Mn ppm | Fe ppm | Zn ppm |
|---|---|---|---|---|---|
| Cu—Cr—Zn—O (Example 10) | 182 | 43.7 | — | — | 1.69 |
| Cu—Cr—O (Comparative Example 2) | 2651 | 44.6 | — | — | — |
| Cu—Cr—Mn—O (Comparative Example 5) | 5901 | 153 | 285 | — | — |
| Cu—Cr—Fe—O (Comparative Example 8) | 4317 | 55.5 | — | 110 | — |

TABLE 3

| Ion Concentration in 20 wt % NaOH Solution | Cu ppm | Cr ppm | Mn ppm | Fe ppm | Zn ppm |
|---|---|---|---|---|---|
| Cu—Cr—Zn—O (Example 10) | 131 | 23.4 | — | — | 0.13 |
| Cu—Cr—O (Comparative Example 2) | 212 | 34.6 | — | — | — |
| Cu—Cr—Mn—O (Comparative Example 5) | 314 | 41.3 | 1.43 | — | — |
| Cu—Cr—Fe—O (Comparative Example 8) | 243 | 29.2 | — | 1.07 | — |

From the results shown in Tables 2 and 3 described above, in terms of the durability of the pigment, the Cu—Cr—Zn—O based pigment according to the present invention has better results in acid resistance and alkali resistance than other pigments.

The pigment is required to have the acid resistance or the alkali resistance depending on usage purposes, and for example, when a pigment is used in an acid-resistant coating material, an acid-resistant rubber, a vinyl chloride resin, or the like, it is necessary to use a pigment having good acid resistance, and when a pigment is used in a coating material for concrete and a mortar, a coating material using a basic compound such as water glass as a vehicle, or the like, it is necessary to use a pigment having good alkali resistance. When the acid resistance and alkali resistance of the pigment are poor, poor dispersion of the pigment in a solvent for a purpose of coloring, and elution of a pigment component or a change in the color tone over time due to decomposition of the pigment occur. In the Cu—Cr—O based pigment, the elution of hexavalent chromium in the solvent is concerned. However, the Cu—Cr—Zn—O based pigment according to the present invention has a most excellent durability of the pigment itself as compared with the Cu—Cr—O based pigment, the Cu—Cr—Mn—O based pigment, or the Cu—Cr—Fe—O based pigment.

It can be said that the durability of the pigment is influenced by a size of a particle diameter of the pigment because the number of eluted ions decreases as a solid-liquid interface of the pigment to the resin or the coating material becomes smaller regarding, for example, the acid resistance and the alkali resistance, in addition to stability of the crystal structure. In the solid phase reaction in the calcining step during the production of the based pigment, the higher the calcining temperature is, the more promoted a particle growth is and the more coarsened particles are. In the Cu—Cr—Zn—O based pigment, the calcining temperature can be set to a higher temperature. Since the size of the particle diameter of the pigment obtained as a resultant can be easily controlled, it is considered that Cu—Cr—Zn—O based pigment has higher durability of the pigment itself than the Cu—Cr—O based pigment, the Cu—Cr—Mn—O based pigment, or the Cu—Cr—Fe—O based pigment.

Next, evaluation results of (d) eluting amount of hexavalent chromium will be described. The present evaluation was performed based on the EPA3060A method.

The evaluation results of the eluting amount of hexavalent chromium based on the EPA3060A method are shown in Table 4 below.

TABLE 4

| | $Cr^{6+}$ ppm |
|---|---|
| Cu—Cr—Zn—O (Example 10) | 250 |
| Cu—Cr—O (Comparative Example 2) | 508 |
| Cu—Cr—Mn—O (Comparative Example 5) | 681 |
| Cu—Cr—Fe—O (Comparative Example 8) | 312 |

In Table 4 described above, the pigment containing hexavalent chromium in the smallest eluting amount was the Cu—Cr—Zn—O based pigment shown in Example 10, and a numerical value thereof was 250 ppm. The Cu—Cr—O based pigment shown in Comparative Example 2, the Cu—Cr—Mn—O based pigment shown in Comparative Example 5, and the Cu—Cr—Fe—O based pigment shown in Comparative Example 8 all contained hexavalent chromium in an eluting amount larger than that in Example 10. Further, in Comparative Example 5, the eluting amount of hexavalent chromium was largest, and a numerical value thereof was 681 ppm. Based on the evaluation results of (a) and (d), it can be said that the method of adding $MnO_2$ as the modifying oxide to improve the color tone of the Cu—Cr—O based pigment is extremely effective, but there is a disadvantage that the durability of the pigment is impaired due to an increase in the eluting amount of hexavalent chromium. In contrast, the Cu—Cr—Zn—O based pigment according to the present invention to which ZnO is added as the modifying oxide has superiority in comparison to the Cu—Cr—O based pigment to which the known modifying oxide $MnO_2$ or $Fe_2O_3$ is added because the improvement in the color tone and the improvement in the durability of the Cu—Cr—O based pigment are achieved at the same time.

Last, an evaluation result of (e) red discoloration test for the glass color will be described.

Figure 2:
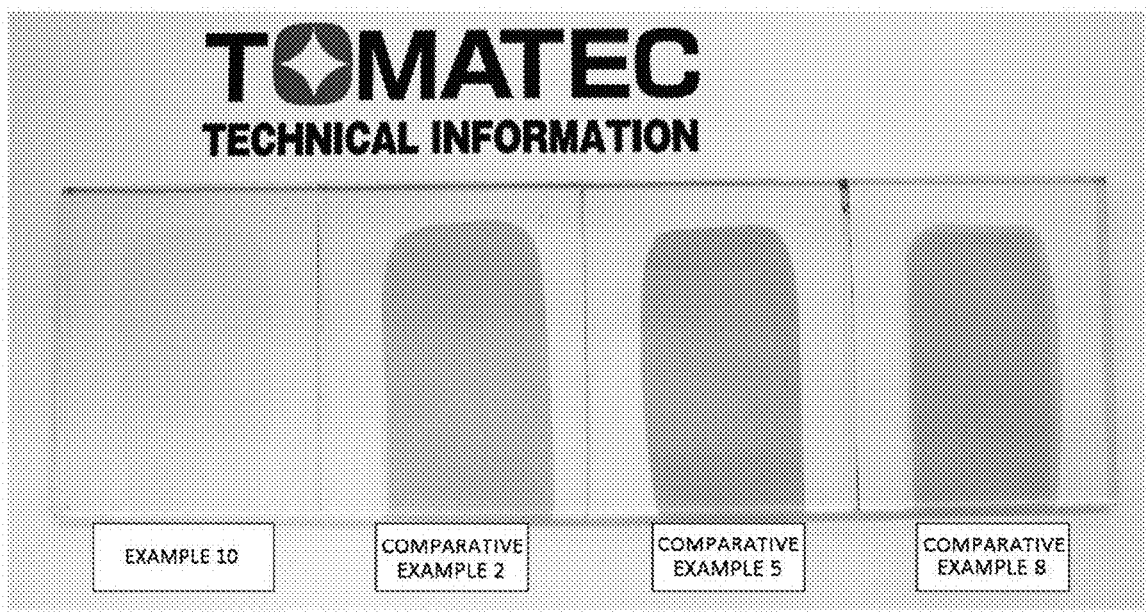
FIG. 2 is a photograph showing the tin surface of the plate glass after the red discoloration test using various pigments.

FIG. 2 shows photographs of the tin surface of the plate glass after the red discoloration test using various pigments.

As described above, when the Cu—Cr—Zn—O based pigment shown in Example 10 was used to perform the red discoloration test, a glass substrate was hardly discolored, and in all cases where the Cu—Cr—O based pigment shown in Comparative Example 2, the Cu—Cr—Mn—O based pigment shown in Comparative Example 5, and the Cu—Cr—Fe—O based pigment shown in Comparative Example 8 were used to perform the red discoloration test, the glass substrate turned red. The red discoloration in the glass color is caused by the reduction of copper as a Cu—Cr—O based pigment component by tin on a surface of the plate glass, and generally, the red discoloration in the glass color is more remarkably exhibited as the Cu—Cr—O based pigment having lower durability (heat resistance). Therefore, based on the evaluation results of the red discoloration test, it can be said that the Cu—Cr—Zn—O based pigment according to the present invention is excellent in the durability of the pigment itself as compared with the Cu—Cr—O based pigment, the Cu—Cr—Mn—O based pigment, or the Cu—Cr—Fe—O based pigment.

From the characteristic tests (a) to (e) described above, the Cu—Cr—Zn—O based pigment according to the present invention has an advantage that the degree of blackness is substantially the same but the redness and the blueness are high in terms of the color characteristic as compared with another Cu—Cr—O based pigment such as the commonly used Cu—Cr—Mn—O based pigment, and has an effect that the pigment is clearly excellent in terms of the durability.

Obviously, numerous modifications and variations of the present invention are possible in light of the above teachings. It is therefore to be understood that within the scope of the appended claims, the invention may be practiced otherwise than as specifically described herein.

What is claimed is:

1. A Cu—Cr—Zn—O based pigment comprising:
   a Cu—Cr—O based oxide;
   Zn solid-dissolved in the Cu—Cr—O based oxide; and
   the Cu—Cr—Zn—O based pigment having a composition formula of $aCuO \cdot bCr_2O_3 \cdot cZnO$ (mol %), in which $0.1 \leq c \leq 5$, $45 \leq a+c \leq 55$, and $45 \leq b \leq 55$ ($a+b+c=100$).

2. The Cu—Cr—Zn—O based pigment according to claim 1, wherein
   a by-product $CuCrO_2$ is not included in an X-ray diffraction pattern.

3. The Cu—Cr—Zn—O based pigment according to claim 1, wherein
   the Cu—Cr—Zn—O has a spinel structure that is formed by calcining a batch obtained by mixing a copper compound, a chromium compound, and a zinc compound as a starting material by a dry method at a temperature of 800° C. to 1000° C.

4. The Cu—Cr—Zn—O based pigment according to claim 1, which is used as a coloring pigment for a coating material, plastic, and glass.

5. The Cu—Cr—Zn—O based pigment according to claim 1, wherein
   an eluting amount of hexavalent chromium in a pigment eluate based on an EPA3060A method is 250 ppm or less.

6. The Cu—Cr—Zn—O based pigment according to claim 1, which is used for a glass color, and which does not exhibit red discoloration when the Cu—Cr—Zn—O based pigment is baked on a tin surface of a float plate glass at 500° C. to 700° C.

7. The Cu—Cr—Zn—O based pigment according to claim 1, which is used in a laser direct structuring (LDS).

8. The Cu—Cr—Zn—O based pigment according to claim 1, wherein XRD patterns of the Cu—Cr—Zn—O based pigment include all peaks in XRD patterns of $CuCr_2O_4$ which is a structure of the Cu—Cr—O based pigment.

* * * * *